No. 755,405. PATENTED MAR. 22, 1904.
E. SORRENTINO.
HEATING CUP.
APPLICATION FILED NOV. 16, 1903.
NO MODEL.
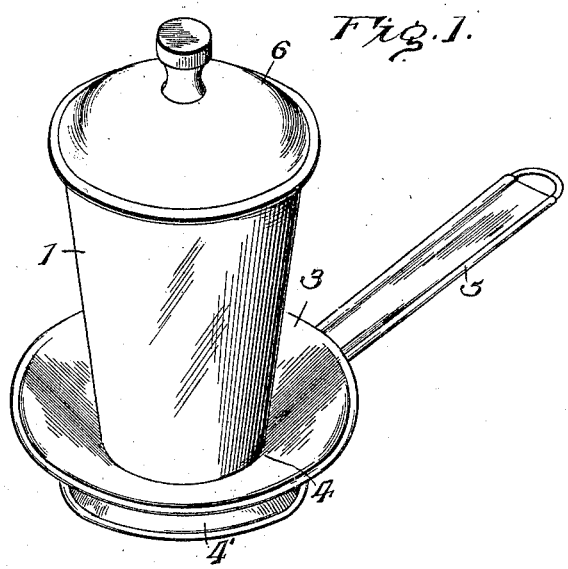
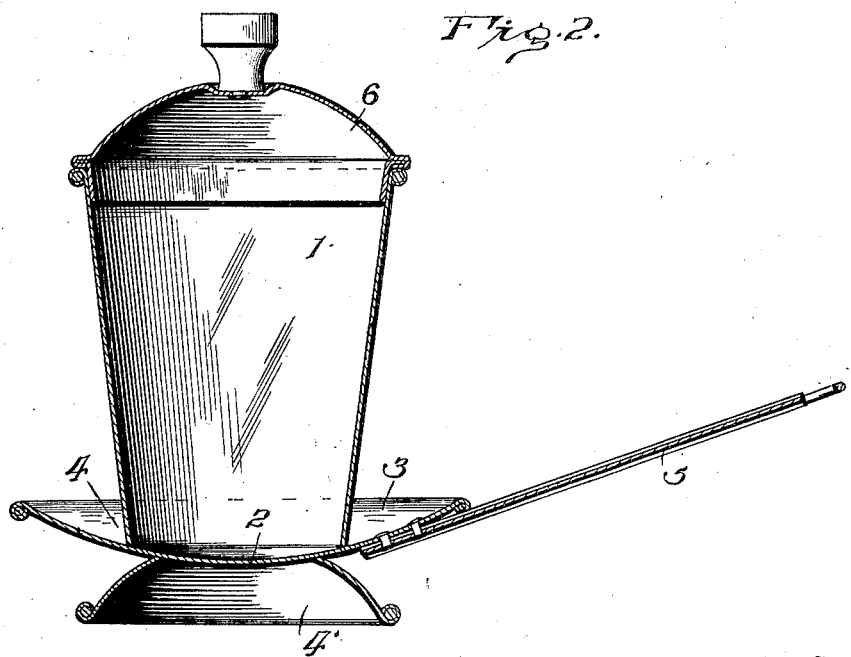

No. 755,405.

Patented March 22, 1904.

UNITED STATES PATENT OFFICE.

ERCOLE SORRENTINO, OF BRADFORD, PENNSYLVANIA.

HEATING-CUP.

SPECIFICATION forming part of Letters Patent No. 755,405, dated March 22, 1904.

Application filed November 16, 1903. Serial No. 181,402. (No model.)

*To all whom it may concern:*

Be it known that I, ERCOLE SORRENTINO, a citizen of the United States, residing at Bradford, in the county of McKean and State of Pennsylvania, have invented new and useful Improvements in Heating-Cups, of which the following is a specification.

My invention relates to improvements in cups for heating water, the object of which is to so construct a cup that water contained therein can be heated with the use of a small amount of alcohol and without the necessity of using a separate lamp or stove for that purpose.

In the accompanying drawings, Figure 1 is a perspective view of a cup embodying my invention. Fig. 2 is a central vertical sectional view thereof.

Referring now to the drawings, 1 indicates the body portion of the cup, which is formed of sheet metal and has open ends. The bottom 2 of the cup is provided with a laterally circumferentially extending flange 3, the said flange being turned upwardly to form a surrounding alcohol receiving and burning channel 4.

Extending from the bottom 2 is a support 4', which serves to support the oil-containing flange or channel out of contact with the object upon which the cup is set, whereby the device in operation will not burn the object upon which it is rested.

5 is a handle, by means of which the cup can be held either while the water is being heated or for the purpose of transportation thereafter, and 6 is a suitable cover therefor.

In the construction here shown it will be noted that the support 4' where it engages the bottom is of a circumference less than the circumference of the bottom of the cup, whereby the water contained in the cup will prevent the support 4' from becoming sufficiently heated to burn any object upon which it is placed. In other words, the support 4' cannot become any hotter than the water contained in the cup or vessel 1. Furthermore, in the construction here shown the bottom itself extends out and forms by its surrounding flange the alcohol-receiving channel.

A device of the character herein shown will be very convenient for travelers and others wishing to heat a small amount of water, milk, or other liquid.

Having thus described my invention, what I claim as new, and desire to secure by Letters Patent, is—

1. A heating-cup comprising a body portion having a bottom and also a circumferentially-arranged fluid-containing channel at its lower end, a support for the cup connected to the bottom, and a handle extending outward below the line of the flame from said fluid-channel.

2. A heating-cup comprising a body portion, having a bottom and a circumferentially-arranged fluid-receiving channel around its lower end, and a support connected to the bottom and of a diameter at the point of connection not exceeding the diameter of the bottom, for the purpose described.

In testimony whereof I have hereunto set my hand in the presence of two subscribing witnesses.

ERCOLE SORRENTINO.

Witnesses:
EDWARD JIFKINS,
HERMAN H. NORTH.